United States Patent
Marais et al.

(10) Patent No.: US 10,853,770 B2
(45) Date of Patent: Dec. 1, 2020

(54) AIRCRAFT MAINTENANCE PROGRAM BRIDGING SYSTEMS AND METHODS

(71) Applicant: THE BOEING COMPANY, Chicago, IL (US)

(72) Inventors: Leroux Marais, Vancouver (CA); Jan Edgar Schnider, Surrey (CA)

(73) Assignee: THE BOEING COMPANY, Chicago, IL (US)

( * ) Notice: Subject to any disclaimer, the term of this patent is extended or adjusted under 35 U.S.C. 154(b) by 417 days.

(21) Appl. No.: 15/287,043

(22) Filed: Oct. 6, 2016

(65) Prior Publication Data

US 2018/0101996 A1 Apr. 12, 2018

(51) Int. Cl.
*B64F 5/00* (2017.01)
*G06Q 10/00* (2012.01)
*B64F 5/40* (2017.01)

(52) U.S. Cl.
CPC .............. *G06Q 10/20* (2013.01); *B64F 5/40* (2017.01)

(58) Field of Classification Search
CPC ................................ G06Q 10/20; G07C 5/006
USPC ........................................................ 701/29.4
See application file for complete search history.

(56) References Cited

U.S. PATENT DOCUMENTS

| | | | | |
|---|---|---|---|---|
| 8,266,066 B1* | 9/2012 | Wezter | ................... | G06Q 10/10 703/20 |
| 2003/0233178 A1* | 12/2003 | Sinex | ................... | G06Q 10/025 701/29.1 |
| 2005/0187739 A1* | 8/2005 | Baust | ............... | G06Q 10/06311 702/184 |
| 2008/0306799 A1* | 12/2008 | Sopko, III | ............. | G06Q 10/06 705/7.12 |
| 2009/0187449 A1* | 7/2009 | van Tulder | ............ | G06Q 10/06 705/7.17 |

* cited by examiner

*Primary Examiner* — Anshul Sood
(74) *Attorney, Agent, or Firm* — The Small Patent Law Group LLC; Joseph M. Butscher (57) ABSTRACT

An aircraft maintenance bridging system and method are configured to determine at least one transition option that transitions one or more aircraft from a current maintenance program schedule to a new maintenance program schedule. The aircraft maintenance bridging method includes analyzing the current maintenance program schedule and the new maintenance program schedule with a maintenance bridging determination control unit, and determining the transition option(s), using the maintenance bridging determination control unit, for the aircraft based on analyzing the current maintenance program schedule and the new maintenance program schedule.

20 Claims, 4 Drawing Sheets

AIRCRAFT MAINTENANCE PROGRAM BRIDGING SYSTEMS AND METHODS

FIELD OF THE DISCLOSURE

Embodiments of the present disclosure generally relate to systems and methods for efficiently transitioning from a current maintenance program for one or more aircraft to a new maintenance program for the aircraft.

BACKGROUND OF THE DISCLOSURE

Commercial aircraft include numerous systems, sub-systems, components, and the like that are subject to maintenance schedules to ensure airworthiness of the aircraft. In general, a separate and distinct maintenance program schedule (or maintenance plan) is determined for each aircraft within a fleet of aircraft. The maintenance program schedule provides dates by which each particular system, sub-system, component, or the like of the aircraft is to be serviced (such as through inspection, part servicing, part replacement, and/or the like). The maintenance program schedule specifies intervals indicating when each maintenance task is to be completed (in terms of calendar days, flight hours, and/or flight cycles) in order to ensure that the aircraft is airworthy. The maintenance program schedule specifies dates when specific tasks are planned. In contrast, a maintenance program document specifies the intervals and thresholds that are to be met (in terms of days, cycles, and/or flight hours).

For various reasons, an operator of an aircraft may desire to transition from a current maintenance program schedule to a new maintenance program schedule. For example, an operator may desire to update a current maintenance program schedule based on changing needs, capabilities, and the like. As another example, an aircraft may be leased or sold to another operator, who prefers a different maintenance program schedule. As such, a current maintenance program schedule may be transitioned to a new maintenance program schedule.

During the transition period, task rules for the current maintenance program schedule remain in force until the new maintenance program schedule is fully in effect. That is, the task rules for the current maintenance program are complied with during the transition period. However, the transition period may last longer than expected, due to the intervals of tasks involved, and/or the thousands of tasks that are to be completed, and switched over to the new maintenance program schedule.

Typically, the transition between the current maintenance program to the new maintenance program is managed and executed by individuals, such as subject matter experts in maintenance planning and scheduling. As can be appreciated, however, transitioning numerous aircraft within a fleet to a new maintenance program may be an overwhelming task for individual subject matter experts, and may require hundreds if not thousands of hours of analysis.

Moreover, a long, protracted transition period between maintenance program schedules typically adds complexity for maintenance personnel, as each aircraft needs to be maintained with respect to both the current (or former) maintenance program schedule and the new (or target) maintenance program schedule. As such, aircraft operators typically desire quick transition periods. However, a transition period that is too hasty may necessitate an undesirable amount of rework. Accordingly, a tradeoff exists between a transition time and a desired amount of rework.

SUMMARY OF THE DISCLOSURE

A need exists for a system and method of efficiently and effectively transitioning one or more aircraft from a current maintenance program schedule to a new maintenance program schedule.

With those needs in mind, certain embodiments of the present disclosure provide an aircraft maintenance bridging system that is configured to determine at least one transition option that transitions one or more aircraft from a current maintenance program schedule to a new maintenance program schedule. The aircraft maintenance bridging system includes a maintenance bridging determination control unit that is configured to analyze the current maintenance program schedule and the new maintenance program schedule and determine the transition option(s) for the aircraft based on the analysis of the current maintenance program schedule and the new maintenance program schedule.

The aircraft maintenance bridging system may also include a maintenance resource database in communication with the maintenance bridging determination control unit. The maintenance resource database stores resource data of an aircraft operator. In at least one embodiment, the maintenance bridging determination control unit is configured to analyze the resource data in conjunction with the current maintenance program schedule and the new maintenance program schedule to determine the transition option(s). The resource data may include labor availability, facilities availability, parts availability, equipment availability, and/or aircraft use.

In at least one embodiment, the one or more aircraft includes a plurality of aircraft. The current maintenance program schedule may be different for at least two of the plurality of aircraft. The new maintenance program schedule may be different for at least two of the plurality of aircraft.

The maintenance bridging determination control unit may be configured to determine the transition option(s) based, in part, on one or more factor preferences. The factor preferences may include reduced labor costs, reduced parts costs, reduced equipment costs, and/or reduced transition time.

Certain embodiments of the present disclosure provide an aircraft maintenance bridging method that is configured to determine at least one transition option that transitions one or more aircraft from a current maintenance program schedule to a new maintenance program schedule. The aircraft maintenance bridging method includes analyzing the current maintenance program schedule and the new maintenance program schedule with a maintenance bridging determination control unit, and determining the transition option(s) (using the maintenance bridging determination control unit) for the aircraft based on analyzing the current maintenance program schedule and the new maintenance program schedule.

The aircraft maintenance bridging method may also include storing resource data of an aircraft operator within a maintenance resource database, and communicatively coupling the maintenance bridging determination control unit to the maintenance resource database. In at least one embodiment, the analyzing includes analyzing the resource data in conjunction with the current maintenance program schedule and the new maintenance program schedule to determine the transition option(s).

Certain embodiments of the present disclosure provide an aircraft maintenance bridging system that is configured to determine a plurality of transition options that transition a plurality of aircraft from a plurality of current maintenance program schedules to a plurality of new maintenance program schedules. The plurality of current maintenance program schedules are different for at least two of the plurality of aircraft, and the plurality of new maintenance program schedules are different for at least two of the plurality of aircraft. The aircraft maintenance bridging system includes a maintenance resource database that stores resource data of an aircraft operator, and a maintenance bridging determination control unit communicatively coupled to the maintenance resource database. The maintenance bridging determination control unit is configured to (a) analyze the plurality of current maintenance program schedules, the plurality of new maintenance program schedules, and the resource data, and (b) determine the plurality of transition options for the plurality of aircraft based on the analysis of the plurality of current maintenance program schedules, the plurality of new maintenance program schedules, the resource data, and one or more factor preferences. The resource data includes labor availability, facilities availability, parts availability, equipment availability, and aircraft use. The factor preference(s) include one or more of reduced labor costs, reduced parts costs, reduced equipment costs, or reduced transition time.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide aircraft maintenance bridging systems and methods that automate and optimize development of implementable maintenance bridging plans for aircraft owners and/or operators. The maintenance bridging systems and methods are configured to generate optimized maintenance bridging plans for large and complex fleets of aircraft.

Certain embodiments of the present disclosure provide aircraft maintenance bridging systems and methods that are configured to transition (that is, "bridge") one or more aircraft from one maintenance program to another maintenance program. The embodiments of the present disclosure minimize or otherwise reduce costs and/or out-of-service status for aircraft when transitioning from one maintenance program to another maintenance program.

Certain embodiments of the present disclosure provide aircraft maintenance bridging systems and methods that optimize or otherwise improve a transition from one maintenance program to another, which take into account labor, facilities, parts, equipment, records, upcoming flight schedules, and other factors so as to minimize or otherwise reduce down time and maximize or otherwise increase the utilization of aircraft.

Figure 1:
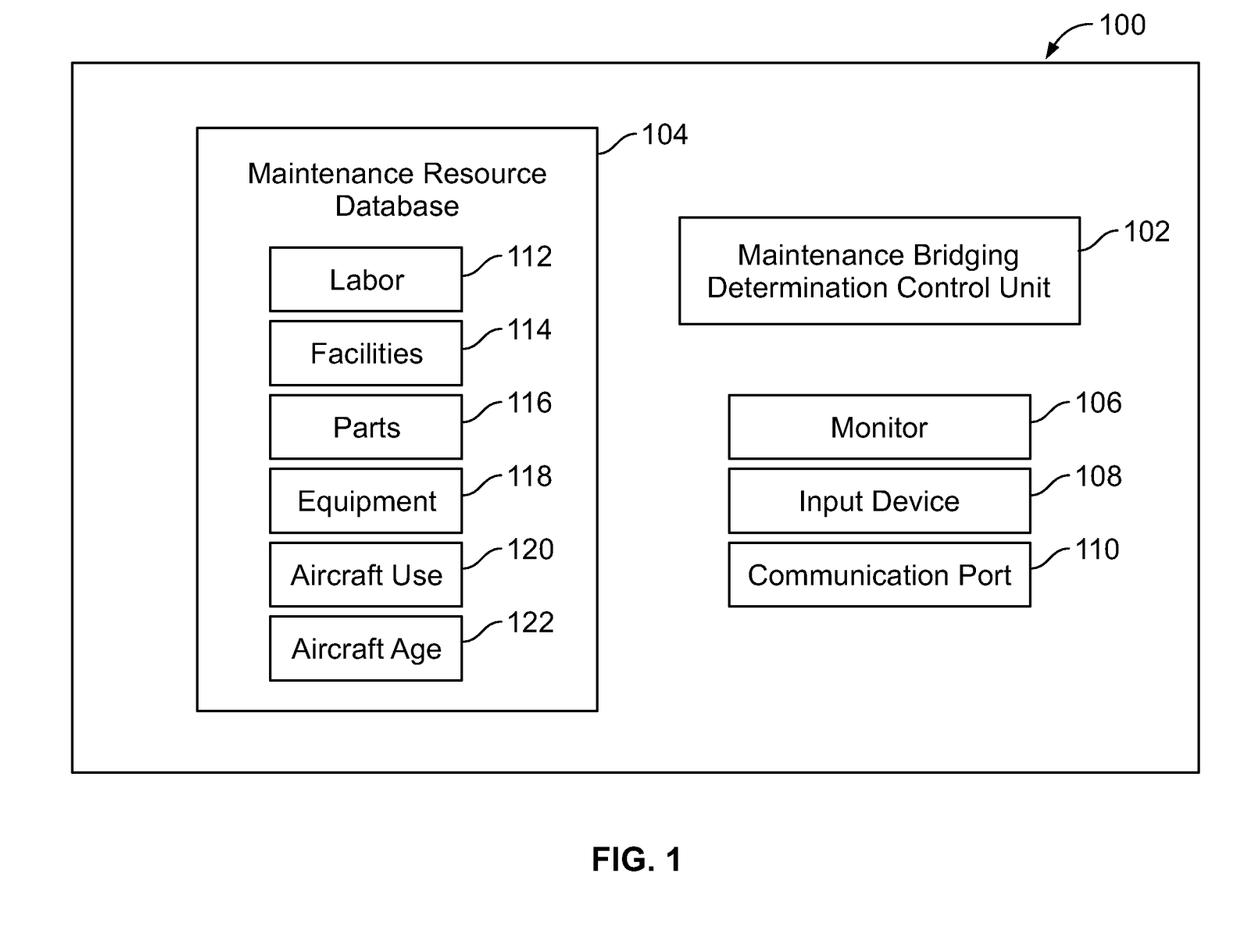
FIG. 1 is a schematic representation of an aircraft maintenance bridging system, according to an embodiment of the present disclosure.

FIG. 1 is a schematic representation of an aircraft maintenance bridging system 100, according to an embodiment of the present disclosure. The aircraft maintenance bridging system 100 includes a maintenance bridging determination control unit 102 in communication with a maintenance resource database 104, such as through one or more wired or wireless connections. As shown, the maintenance bridging determination control unit 102 and the maintenance resource database 104 may be contained within a common housing, such as within a computer workstation. In at least one other embodiment, the maintenance bridging determination control unit 102 may be remotely located from the maintenance resource database 104.

The aircraft maintenance bridging system 100 may also include a monitor 106 (such as a computer screen, a television screen, a touchscreen, a digital display, and/or the like), an input device 108 (such as a keyboard, a mouse, a touchscreen, and/or the like), and a communication port 110 (such as a wireless or wired communication port), each of which may be communicatively coupled to the maintenance bridging determination control unit 102. The maintenance bridging determination control unit 102 may output signals to the monitor 106. An individual may input data, selections, and the like into the maintenance bridging determination control unit 102 through the input device 108. The maintenance bridging determination control unit 102 may receive data (such as maintenance program schedules) from an outside source through the communication port 110. Alternatively, the aircraft maintenance bridging system 100 may not include the monitor 106, the input device 108, and/or the communication port 110.

The maintenance resource database 104 may receive data regarding various aircraft operator resources through the communication port 110. The maintenance resource database 104 includes various operator resource data storage areas, such as labor availability data storage are 112, facilities availability data storage area 114, parts availability data storage area 116, equipment availability data storage area 118, aircraft use data storage area 120, aircraft age data storage area 122, and/or the like. The maintenance resource database 104 may store data regarding more or less operator resources than shown.

The labor availability data storage area 112 includes data regarding the availability of aircraft maintenance personnel. For example, the labor availability data storage area 112 may include data regarding the number of aircraft maintenance personnel, hourly rates thereof, number of hours worked over a particular time period, number of hours to work over a particular period, and/or the like.

The facilities availability data storage area 114 includes data regarding the availability of aircraft maintenance facilities, such as hangars, tarmac areas, and/or the like where an aircraft may be serviced. For example, the facilities availability data storage area 114 may include data regarding the number of hangars, the capacity thereof, current levels of availability for use, future levels of availability for use, and/or the like.

The parts availability data storage area 116 includes data regarding the various parts for various systems, sub-systems, components available for maintenance. For example, the parts availability data storage area 116 may include data regarding the types and number of available parts, predicted future use, and/or the like.

The equipment availability data storage area 118 includes data regarding the number and types of maintenance equipment (including various manual and automatic tools) that are available at a given time. For example, the equipment availability data storage area 118 may include data regarding the types and number of equipment, current use thereof, and future predicted use thereof.

The aircraft use data storage area 120 includes data regarding the use of one or more aircraft within a fleet of aircraft. For example, the aircraft use data storage area 120 may include data regarding the flight hours/cycles of each aircraft within a fleet, average air speeds, maximum air speeds, average length of flights, and/or the like.

The aircraft age data storage area 122 includes data regarding the age of one or more aircraft within a fleet of aircraft. For example, the aircraft age data storage area 122 may include manufacture date of each aircraft, acquisition data of each aircraft, and/or the like. In at least one embodiment, the aircraft age data storage area 122 stores data regarding a current state of aircraft with respect to different tasks, such as the types of tasks that were performed and dates of completion.

In operation, the maintenance bridging determination control unit 102 receives a current maintenance program schedule and a new or target maintenance program schedule for one or more aircraft. In at least one embodiment, the maintenance bridging determination control unit 102 analyzes the current and new maintenance program schedules in relation to data within the maintenance resource database 104 to generate one or more transition options that provide transition dates to the new maintenance program schedule. The transition options are determined by the maintenance determination control unit 102 and used to determine one or more efficient transition dates between the current and new maintenance program schedules, thereby efficiently bridging the current maintenance program to the new maintenance program schedule. In at least one embodiment, the maintenance determination control 102 generates transition options for transition dates to transition individual aircraft from a current maintenance program schedule to a new maintenance program schedule. In short, there may not be a single transition date for a fleet of aircraft, but rather numerous transition dates for numerous aircraft within a fleet.

Figure 2:
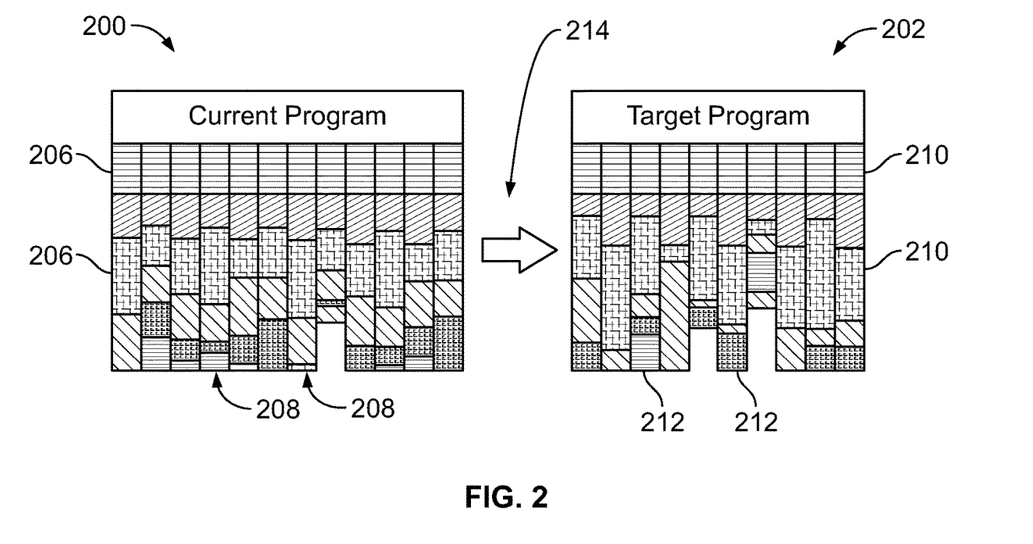
FIG. 2 is a schematic representation of a current maintenance program schedule and a new maintenance program schedule, according to an embodiment of the present disclosure.

FIG. 2 is a schematic representation of a current maintenance program schedule 200 and a new maintenance program schedule 202, according to an embodiment of the present disclosure. Each of the current and new maintenance program schedules 200 and 202 provides information as to what (the particular task), where (the location of the performance of the task), when (the date of the task), and by who (the maintenance personnel assigned to the task) with respect to maintenance tasks for an aircraft. The current maintenance program schedule 200 includes numerous tasks 206 for various systems, sub-systems, components, and the like of an aircraft to be performed at various times 208 in order to maintain the airworthiness of the aircraft. A maintenance program schedule may be generated for each and every aircraft within a fleet of aircraft.

Similarly, the new maintenance program schedule 202 includes numerous tasks 210 for various systems, sub-systems, components, and the like of the aircraft to be performed at various times 212 in order to maintain the airworthiness of the aircraft. A transition period 214 is defined between the current maintenance program schedule 200 and the new maintenance program schedule 202. During the transition period 214, all of the tasks 206 falling due within the transition period 214 are to be completed by their defined schedule dates 208. After the transition period, the tasks 210 are completed according to the times 212 of the new maintenance program schedule 202.

Referring to FIGS. 1 and 2, the maintenance bridging determination control unit 102 determines the transition dates at which one or more of the tasks 206 are switched over to those of the new maintenance program 202. For example, one of the tasks 206 may be related to landing gear component part replacement, which may be scheduled for every three months under the current maintenance program schedule 202. The maintenance bridging determination control unit 102 may analyze the current maintenance program schedule 200 and determine that such landing gear component part replacement occurred one month ago, and that the new maintenance program schedule 202 schedules such replacement every month. As such, the maintenance bridging determination control unit 102 may transition such replacement into the new maintenance program schedule 202, as doing so will satisfy both the current maintenance program schedule 200 (that is, such maintenance task will be performed in less than three months from the date last performed with respect to the current maintenance program schedule 200) and the new maintenance program schedule 202 (that is, the maintenance task will be performed within the scheduled monthly date as indicated in the new maintenance program schedule 202).

As another example, one of the tasks 206 may be related to aileron inspection, which may be scheduled for every month under the current maintenance program schedule 202. The maintenance bridging determination control unit 102 may analyze the new maintenance program schedule 202 and find that such aileron inspection is to occur every three months. However, full transition to the new maintenance program may not occur until two months from the current date. As such, during the transition 214, the maintenance bridging determination control unit 102 may dictate that aileron inspection is to be performed once or twice more under the current maintenance program schedule 202 before fully transitioning to the new maintenance bridging determination control unit 102.

As another example, under a current maintenance program schedule 200, there may be an interval of one month for a particular task. Under the new maintenance program schedule 202, the interval that the particular task may be three months. Further, under the current maintenance program schedule 200, an aircraft is due for its inspection in X days, but under the new maintenance program schedule, the next inspection is not until Y days. In a worst case scenario, Y days could be three months from a current date, if in the new maintenance program schedule 202, the inspection is supposed to be inspected yesterday. In such a case, the aircraft would be noncompliant if not inspected early. The maintenance bridging determination control unit 102 is configured to automatically identify such a situation and schedule one or more inspections in the transition period 214 to ensure aircraft compliance.

The maintenance bridging determination control unit 102 analyzes the current and new maintenance program schedules 200 and 202 in this manner for each and every task listed on both the current and new maintenance program schedules 200 and 202 to ensure that scheduled dates of the current maintenance program schedule 200 coming due during the transition period 214 are satisfied (for example, not missed) before the full transition to the new maintenance program schedule 202. The maintenance bridging determination control unit 102 may also analyze the current status of aircraft, in addition to the current and new maintenance program schedules 200 and 202. Each of the current and new maintenance program schedules 200 and 202 includes thousands of tasks related to the various systems, sub-systems, components, and the like of the aircraft that are to be periodically serviced. Depending on the final transition (or cutover date) to the new maintenance program schedule 202, the maintenance bridging determination control unit 102 determines that one or more tasks from the current maintenance program schedule 200 are to be performed on the date(s) specified in the current maintenance program schedule 200, and/or one or more tasks from the current maintenance program schedule 200 may be ignored if the final transition date to the new maintenance program schedule 202 covers the task(s) without the current maintenance program schedule 200 being violated during the transition period 214.

The transition period 214 may be a single day, for example. In at least one other embodiment, the transition period 214 may be longer than a day, such as a week, a month, a year, or longer. Notably, aircraft are compliant with respect to task requirements under the current maintenance program schedule 200 during the transition period 214.

As mentioned above, the maintenance bridging determination control unit 102 analyzes the maintenance program schedules 200 and 202 for a particular aircraft. Further, in at least one embodiment, the maintenance program determination control unit 102 analyzes the maintenance program schedules 200 and 202 for an entire fleet of aircraft to determine a desirable transition or cutover date(s) to the new maintenance program schedule 202 for each aircraft within the fleet. The transition or cutover date(s) may be the same or different for all of the aircraft within the fleet. The maintenance bridging determination control unit 102 analyzes the various resources of a particular aircraft operator in order to determine appropriate transition dates to the new maintenance program schedules 202 for each aircraft within the fleet. As can be appreciated, a fleet of aircraft may include tens, hundreds, or even thousands of aircraft.

Based on the various data stored within the maintenance resource database 104, such as the labor availability data storage 112, the facilities availability data storage area 114, the parts availability data storage area 116, the equipment availability data storage area 118, the aircraft use data storage area 120, the aircraft age data storage area 122, and/or the like, the maintenance bridging determination control unit 102 determines and coordinates transitions for each aircraft to respective new maintenance program schedules 202, while also accounting for fleet-wide resource constraints. For example, while a transition date to a new maintenance program schedule 202 for a single aircraft may be determined, a particular aircraft operator may not be able to implement the new maintenance program schedules 202 when factoring in all aircraft within a particular fleet. As such, the bridging determination control unit 102 analyzes the available resources of the aircraft operator, as stored in the maintenance resource database 104, and determines transition dates to the new maintenance program schedules 202 for each of the aircraft based on the available resources.

In at least one embodiment, the maintenance bridging determination control unit 102 may determine a transition plan that includes multiple options for transition dates (that is, transition options). The various transition options may be based on one or more factors, such as desired use of labor, desired labor costs, desired use of facilities, a desired amount of available parts at any one time, a desired amount of equipment on hand at any one time, aircraft availability for maintenance (for example, when the aircraft are not in use), desired possible transition time, and/or the like. The maintenance bridging determination control unit 102 may prompt a user to select a desired option, and/or weight a plurality of options (such as indicating a number of factors to be accounted for, and ranking importance of each factor), such as through the monitor 106. For example, the user may indicate that labor costs are to be weighted higher than facilities usage, or vice versa. The maintenance bridging determination control unit 102 may then provide transition dates to the new maintenance program schedules 202 for the various aircraft in a fleet based on such user weightings and/or selections.

The maintenance bridging determination control unit 102 is configured to provide maintenance program bridging recommendations. Further, the maintenance bridging determination control unit 102 may be configured to provide projected labor costs from the current maintenance program schedule 200, the transition period 214, and the new maintenance program schedule 202 to provide complete and detailed data regarding the maintenance program schedules 200 and 202, as well as potential transition or cutover dates. The maintenance bridging determination control unit 102 may also assess the feasibility and cost of potential new maintenance programs. The maintenance bridging determination control unit 102 may generated and output quantitative measures of full lifecycle labor cost, for example.

As described above, the current and new maintenance program schedules 200 and 202 may be loaded into the aircraft maintenance bridging system 100, such as through the communication port 110, and loaded into a memory that is coupled to the maintenance bridging determination control unit 102. In at least one embodiment, the memory is part of the maintenance resource database 104. In at least one other embodiment, the memory is separate and distinct from the maintenance resource database 104. The maintenance bridging determination control unit 102 analyzes the schedules 200 and 202 and retrieves tasks and due dates thereof (such as in calendar days, flight hours, and/or flight cycles).

The maintenance bridging determination control unit 102 may then determine various costs to complete the tasks, such as through data stored in the maintenance resource database 104. The current maintenance status for each task for each aircraft may also be imported, and the next due date for each task under the current maintenance program schedule 200 may also be recorded. The maintenance bridging determination control unit 102 may then check a list of possible cutover (transition) dates to the new maintenance program schedule 202 and compare such dates to various factors, such as the aircraft age, maintenance status, and the like (stored in the maintenance resource database 104) to determine a feasibility of such cutover dates.

If a given cutover date is feasible for an aircraft, the maintenance bridging determination control unit 102 may then create a maintenance forecast for the aircraft. The maintenance forecast may provide forecasted maintenance dates for various maintenance tasks, projected costs (in terms of labor, parts, equipment, etc.) under one or both of the current and new maintenance program schedules 200 and 202, and the like, thereby providing valuable information as to the cost of ownership/operation of the aircraft As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the maintenance bridging determination control unit 102 may be or include one or more processors that are configured to control operation of the aircraft maintenance bridging system 100, as described above.

The maintenance bridging determination control unit 102 is configured to execute a set of instructions that are stored in one or more data storage units or elements (such as one or more memories), in order to process data. For example, the maintenance bridging determination control unit 102 may include or be coupled to one or more memories. The data storage units may also store data or other information as desired or needed. The data storage units may be in the form of an information source or a physical memory element within a processing machine.

The set of instructions may include various commands that instruct the maintenance bridging determination control unit 102 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the maintenance bridging determination control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the maintenance bridging determination control unit 102 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
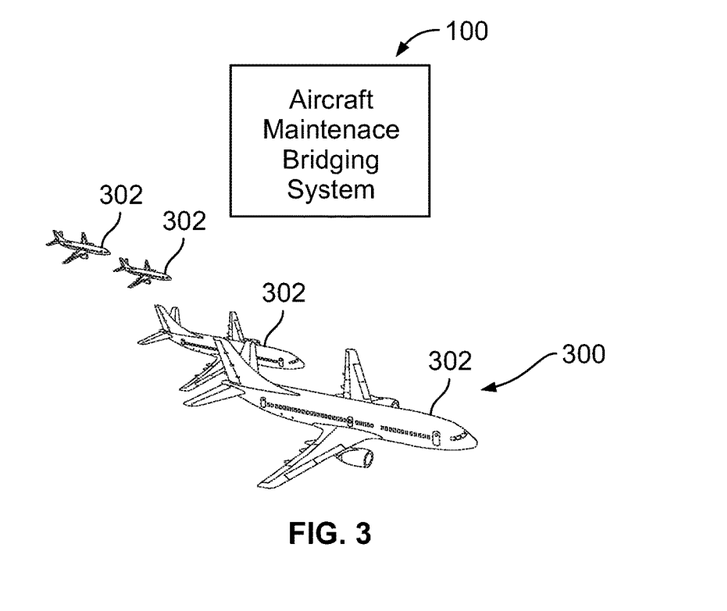
FIG. 3 is a schematic representation of an aircraft maintenance bridging system in relation to a fleet of aircraft, according to an embodiment of the present disclosure.

FIG. 3 is a schematic representation of the aircraft maintenance bridging system 100 in relation to a fleet 300 of aircraft 302, according to an embodiment of the present disclosure. The aircraft maintenance bridging system 100 is configured to efficiently transition each aircraft 302 of the fleet 300 from a current maintenance program schedule 200 (shown in FIG. 2) to a new current maintenance program schedule 200 (shown in FIG. 2), as described above. The fleet 300 may include any number of aircraft 302, such as one hundred aircraft 302, five hundred aircraft 302, one thousand aircraft 302, or more. Optionally, the aircraft maintenance bridging system 100 may be used with a single aircraft 302, instead of a fleet of aircraft.

Figure 4:
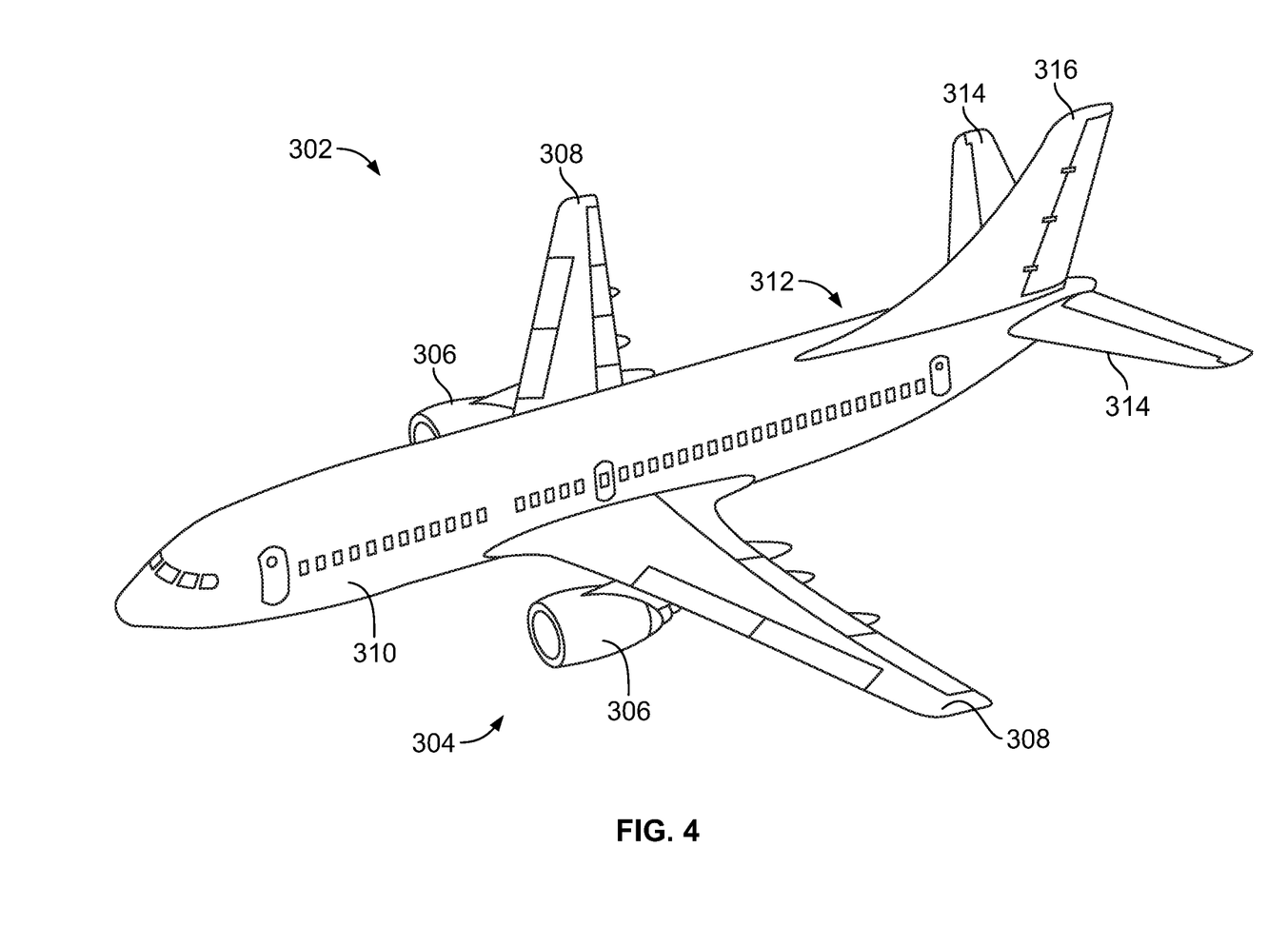
FIG. 4 is a diagrammatic representation of a top perspective view of an aircraft, according to an embodiment of the present disclosure.

FIG. 4 is a diagrammatic representation of a top perspective view of an aircraft 302, according to an embodiment of the present disclosure. The aircraft 302 includes a propulsion system 304 that may include two turbofan engines 306, for example. Optionally, the propulsion system 304 may include more engines 306 than shown. The engines 306 are carried by wings 308 of the aircraft 302. In other embodiments, the engines 306 may be carried by a fuselage 310 and/or an empennage 312. The empennage 312 may also support horizontal stabilizers 314 and a vertical stabilizer 316.

The aircraft 302 includes numerous systems, sub-systems, and components, such as the engines 306, the wings 308, the fuselage 310, internal cabin portions within the fuselage 310 (such as lavatories, cockpits, galleys, electronics, etc.), landing gear, control surfaces, HVAC systems, and/or the like that are listed on maintenance program schedules, such as the schedules 200 and 202 (shown in FIG. 2). Each of the systems, sub-systems, and components is maintained according to one or both of the schedules 200 and 202, such as during the transition period 214 (shown in FIG. 2).

As described above, embodiments of the present disclosure provide systems and methods that allow for efficient analysis and bridging plan generation for one or more aircraft. In at least one embodiment, if a particular transition or cutover date is selected by a user, the maintenance bridging determination control unit 102 automatically determines when maintenance tasks will come due and creates a future maintenance forecast for the aircraft, thereby allowing the user to quickly assess the maintenance implications of choosing a certain cutover date for an aircraft.

Additionally, embodiments of the present disclosure provide the user with a system and method for selecting transition options for aircraft and effectively finding combinations of those transition options for a fleet of planes. The user may select particular preferences (for example, reduced labor costs, time of transition, etc.) for the maintenance bridging determination control unit 102 to account for during the analysis.

Moreover, manually determining optimal transition dates for a large number of aircraft is extremely difficult, if not impossible for a human to determine on his/her own. For example, if the individual wishes to consider two transition options each for one hundred aircraft, there may be millions of possible bridging options. Working manually, the individual may only be able to analyze a few options before having to make a decision. In contrast, embodiments of the present disclosure provide automatic, quick, and efficient analysis of transition options.

Embodiments of the present disclosure provide systems and methods that allow large amounts of data to be quickly and efficiently analyzed by a computing device. For example, as noted, an aircraft typically includes numerous systems, sub-systems, components, and the like, each of which is subject to one or more maintenance tasks. The vast amounts of data are efficiently organized and/or analyzed by the maintenance bridging determination control unit 102, as described above. The maintenance bridging determination control unit analyzes the data in a relatively short time in order to determine one or more transition options. A human being would be incapable of analyzing such vast amounts of data in a reasonable amount of time. As such, embodiments of the present disclosure provide increased and efficient functionality, and vastly superior performance in relation to a human being analyzing the enormous amounts of data. In short, embodiments of the present disclosure provide systems and methods that analyze thousands, if not millions, of calculations and computations that a human being is incapable of efficiently, effectively, and accurately managing.

Figure 5:
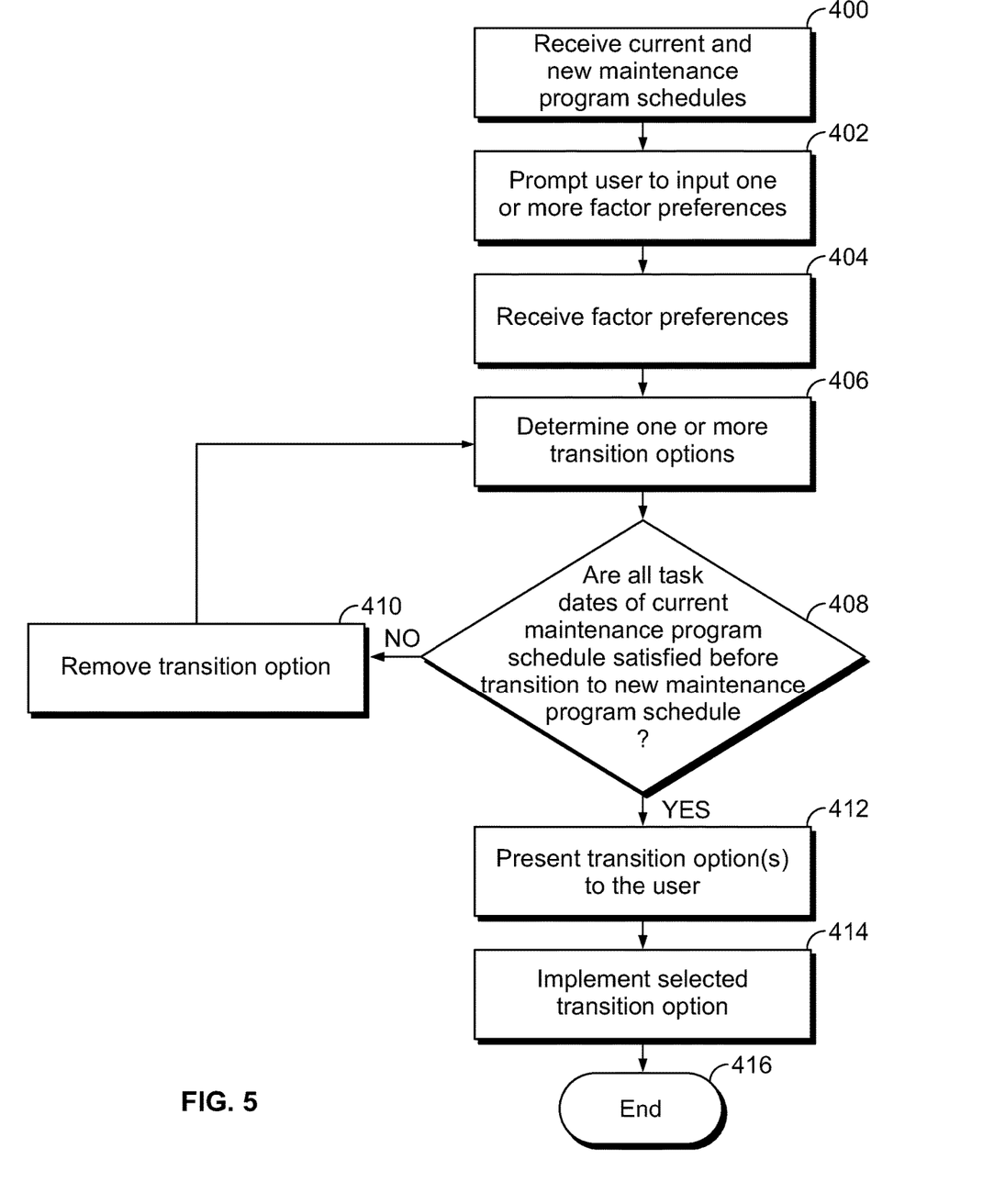
FIG. 5 is a flow chart of a method of determining a transition date from a current maintenance program schedule to a new maintenance program schedule, according to an embodiment of the present disclosure.

FIG. 5 is a flow chart of a method of determining a transition date from a current maintenance program schedule to a new maintenance program schedule, according to an embodiment of the present disclosure. Referring to FIGS. 1, 2, and 5, the method begins at 400, at which the current and new program schedules 200 and 202 are received by the aircraft maintenance bridging system 100, such as through the communication port 110. For example, the program schedules 200 and 202 may be downloaded from a separate and distinct memory device, via the internet, and/or the like.

After receiving the program schedules 200 and 202, the maintenance bridging determination control unit 102 prompts a user, at 402, to input one or more factor preferences, such as through the monitor 106 and/or the input device 108. The maintenance bridging determination control unit 102 receives the factor preferences at 404. The factor preferences may include one or more of minimal labor cost, shortest transition time, minimal parts costs, and/or the like. The user may weight such factor preferences. For example, the user may indicate that minimal labor cost is to be weighted at 50% preference, and that that shortest transition time should be weighted at 25% preference.

The maintenance bridging determination control unit 102 analyzes the program schedules 200 and 202 and resource data (such as may be stored in the maintenance resource database 104), and determines one or more transition options at 406. The transition options may include transition dates from the current maintenance program schedule 200 to the new maintenance program schedule 202, costs associated therewith, and/or tasks that need to be performed.

At 408, the maintenance bridging determination control unit determines if all task dates of the current maintenance program schedule are satisfied before a possible transition to the new maintenance program schedule according to a particular transition option. If not, the method proceeds from 408 to 410, in which the particular transition option is removed or otherwise disregarded, and the process returns to 406.

If, however, the task dates are satisfied at 408, the method proceeds from 408 to 412, in which the transition option(s) are presented to the user, such as via the monitor 106. At 414, the user selects a particular option, and the selected transition option is implemented. The method then ends at 416.

As described above, embodiments of the present disclosure provide systems and methods of efficiently and effectively transitioning one or more aircraft from a current maintenance program schedule to a new maintenance program schedule.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft maintenance bridging system that is configured to determine a plurality of transition options that transition a plurality of aircraft from a plurality of current maintenance program schedules to a plurality of new maintenance program schedules, wherein the plurality of current maintenance program schedules are different for at least two of the plurality of aircraft, and wherein the plurality of new maintenance program schedules are different for at least two of the plurality of aircraft, the aircraft maintenance bridging system comprising:
   a maintenance resource database that stores resource data of an aircraft operator; and
   a maintenance bridging determination control unit communicatively coupled to the maintenance resource database, wherein the maintenance bridging determination control unit is configured to:
      analyze the plurality of current maintenance program schedules, the plurality of new maintenance program schedules, and the resource data, and
      determine the plurality of transition options for the plurality of aircraft based on the analysis of the plurality of current maintenance program schedules, the plurality of new maintenance program schedules, the resource data, and one or more factor preferences, wherein the resource data includes labor availability, facilities availability, parts availability, equipment availability, and aircraft use, and wherein the one or more factor preferences comprises one or more of reduced labor costs, reduced parts costs, reduced equipment costs, or reduced transition time.

2. An aircraft maintenance bridging system that is configured to determine at least one transition option that transitions one or more aircraft from a current maintenance program schedule to a new maintenance program schedule, the aircraft maintenance bridging system comprising:
   a maintenance bridging determination control unit comprising one or more processors that are configured to analyze the current maintenance program schedule and the new maintenance program schedule and determine the at least one transition option for the one or more aircraft based on the analysis of the current maintenance program schedule and the new maintenance program schedule; and
   a monitor in communication with the maintenance bridging determination control unit,
   wherein the maintenance bridging determination control unit is configured to output a signal regarding the at least one transition option to the monitor, and
   wherein the monitor is configured to show the at least one transition option.

3. The aircraft maintenance bridging system of claim 2, further comprising a maintenance resource datastore in communication with the maintenance bridging determination control unit, wherein the maintenance resource datastore stores resource data of an aircraft operator, wherein the maintenance bridging determination control unit is configured to analyze the resource data in conjunction with the current maintenance program schedule and the new maintenance program schedule to determine the at least one transition option.

4. The aircraft maintenance bridging system of claim 3, wherein the resource data comprises labor availability data.

5. The aircraft maintenance bridging system of claim 3, wherein the resource data comprises facilities availability data.

6. The aircraft maintenance bridging system of claim 3, wherein the resource data comprises parts availability data.

7. The aircraft maintenance bridging system of claim 3, wherein the resource data comprises equipment availability data.

8. The aircraft maintenance bridging system of claim 3, wherein the resource data comprises aircraft use data.

9. The aircraft maintenance bridging system of claim 1, wherein the one or more aircraft comprises a plurality of aircraft, wherein the current maintenance program schedule is different for at least two of the plurality of aircraft, and wherein the new maintenance program schedule is different for at least two of the plurality of aircraft.

10. The aircraft maintenance bridging system of claim 1, wherein the maintenance bridging determination control unit is configured to determine the at least one transition option based, in part, on one or more factor preferences.

11. The aircraft maintenance bridging system of claim 10, wherein the one or more factor preferences comprises one or more of reduced labor costs, reduced parts costs, reduced equipment costs, or reduced transition time.

12. An aircraft maintenance bridging method that is configured to determine at least one transition option that transitions one or more aircraft from a current maintenance program schedule to a new maintenance program schedule, the aircraft maintenance bridging method comprising using one or more processors to execute a set of instructions stored in at least one memory to:
   analyze the current maintenance program schedule and the new maintenance program schedule with a maintenance bridging determination control unit;
   determine the at least one transition option, using the maintenance bridging determination control unit, for the one or more aircraft based on the analysis of the current maintenance program schedule and the new maintenance program schedule
   output a signal regarding the at least one transition option to a monitor communicatively coupled to the maintenance bridging determination control unit; and
   show the at least one transition option on the monitor.

13. The aircraft maintenance bridging method of claim 12, further comprising:
   storing resource data of an aircraft operator within a maintenance resource datastore; and
   communicatively coupling the maintenance bridging determination control unit to the maintenance resource datastore, wherein the analyzing comprises analyzing the resource data in conjunction with the current maintenance program schedule and the new maintenance program schedule to determine the at least one transition option.

14. The aircraft maintenance bridging method of claim 13, wherein the resource data comprises labor availability data.

15. The aircraft maintenance bridging method of claim 13, wherein the resource data comprises facilities availability data.

16. The aircraft maintenance bridging method of claim 13, wherein the resource data comprises parts availability data.

17. The aircraft maintenance bridging method of claim 13, wherein the resource data comprises equipment availability data.

18. The aircraft maintenance bridging method of claim 13, wherein the resource data comprises aircraft use data.

19. The aircraft maintenance bridging method of claim 12, wherein the one or more aircraft comprises a plurality of aircraft, wherein the current maintenance program schedule is different for at least two of the plurality of aircraft, and wherein the new maintenance program schedule is different for at least two of the plurality of aircraft.

20. The aircraft maintenance bridging method of claim 12, wherein the using one or more processors to execute a set of instructions stored in at least one memory to determine comprises determining the at least one transition option based, in part, on one or more factor preferences, wherein the one or more factor preferences comprises one or more of reduced labor costs, reduced parts costs, reduced equipment costs, or reduced transition time.

* * * * *